(12) United States Patent
Saunders et al.

(10) Patent No.: US 6,570,923 B2
(45) Date of Patent: May 27, 2003

(54) VIDEO SIGNAL PROCESSING

(75) Inventors: Nicholas Ian Saunders, Basingstoke (GB); Robert Webb, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 281 days.

(21) Appl. No.: 09/727,286

(22) Filed: Nov. 30, 2000

(65) Prior Publication Data

US 2001/0003533 A1 Jun. 14, 2001

(30) Foreign Application Priority Data

Dec. 2, 1999 (GB) .............................. 9928524

(51) Int. Cl.⁷ .............................. H04N 7/12; H04N 9/74
(52) U.S. Cl. .................... 375/240.16; 348/590; 348/700
(58) Field of Search ............. 375/240.16; 348/590–596, 348/700; H04N 9/74, 7/12

(56) References Cited

U.S. PATENT DOCUMENTS 6,323,914 B1 * 11/2001 Linzer ......................... 348/594
6,459,733 B1 * 10/2002 Yokoyama et al. .......... 348/700
6,473,465 B1 * 10/2002 Takahashi .................... 348/595

FOREIGN PATENT DOCUMENTS

| EP | 0 650 298 | 4/1995 | |
| EP | 0 656 729 | 6/1995 | ............ H04N/7/58 |
| EP | 0 912 063 | 4/1999 | |
| GB | 2 327 548 | 1/1999 | .......... H04N/5/268 |
| WO | WO 96/24222 | 8/1996 | ............ H04N/7/26 |
| WO | WO 00 31979 | 6/2000 | |

* cited by examiner

Primary Examiner—Howard Britton
(74) Attorney, Agent, or Firm—Frommer Lawrence & Haug LLP; William S. Frommer

(57) ABSTRACT

Video signal processing apparatus in which at least first and second input video signals are combined to generate an output compressed video signal, the first and second video signals each having respective associated motion vectors from a data compression process applied to the video signals; comprises:

means for establishing a set of the motion vectors associated with the first and second video signals which can potentially be re-used in compressing the output compressed video signal; and means for testing the set of motion vectors, the testing means being operable:

(c) to define, with respect to reference images referred to by the motion vectors under test, a first border region of a predetermined width surrounding those parts of the reference images derived in part from the first video signal, and a second border region of a predetermined width surrounding those parts of the reference images derived in part from the second video signal; and (d) to test whether motion vectors of the set which are associated with parts of each video signal refer either to image areas derived in part from the other video signal, to the first border region or to the second border region;

in which any motion vectors of the set being found by the testing means to refer to images areas derived to at least the predetermined degree from the other input video signal, the first border region or the second border region are not used in the compression of the output compressed video signal.

10 Claims, 9 Drawing Sheets

VIDEO SIGNAL PROCESSING

BACKGROUND OF THE INVENTION

1. Field of the Invention

This invention relates to video signal processing, for example, video signal processing in which data (possibly compressed data) representing two or more video signals are mixed or otherwise combined.

2. Description of the Prior Art

It is often desirable to mix, wipe or superimpose two or more video signals. For example, a so-called wipe effect might be used to transition between two different scenes in a television programme, or a so-called logo or other computer-generated signal such as a subtitle or a set of credits might need to be superimposed over a video image without otherwise disrupting the underlying image.

With analogue video signals, or even with uncompressed digital video signals, this operation is relatively straightforward. A key signal can be used to control the level of each of the constituent video signals (say, signals "A" and "B") at each pixel position, with the two level-controlled signals then being added together. A basic relationship between the level of the key K signal, the levels A and B of the input pixels and the level of the output pixel at each pixel position might be:

$$\text{Output pixel value} = A(1-K) + BK$$

This process is carried out for each output pixel. So, if signal A is to be replaced in its entirety by signal B at a particular pixel position, the key signal would be 1 (otherwise expressed as 100%), and if there is to be a 50:50 mix of the two pixels the key value would be 0.5 or 50%.

The situation is much more difficult when either or both inputs is a compressed video stream. In a compressed video stream such as an MPEG-2 video stream, pixels are generally compressed as blocks known as macroblocks, so that it is not possible to derive the value of a particular pixel directly from the compressed video signal.

Compressed video signals are also often subject to an overall limit on the quantity of data that can be used to transmit or store the signal. While there can be some variation from picture to picture, or even from group-of-pictures (GOP) to GOP, the time-averaged data rate is often constrained to the capacity of a transmission or storage channel. This allowable variation from picture to picture or GOP to GOP can mean that two signals to be combined can have the same nominal data rate but very different instantaneous data rates. So, when constructing a composite video signal from a group of video signals including one or more compressed signals, great care is needed to avoid a data overflow or underflow.

A third feature of compressed video signals relevant to this discussion is that they often make use of motion vectors to indicate blocks of temporally preceding or following pictures which are similar to a block of a current picture and so can cut down the amount of data needed to encode the current picture. Where two signals are being combined, however, it is possible that a motion vector for a current picture block can point to an area of a preceding or following image which has been replaced by or mixed with another input signal, so that the motion vector is no longer useful in the compression or decompression of that block.

One way of handling these problems is to decompress the entire compressed input signals, carry out the mixing or similar process in the non-compressed domain, and then re-compress the resulting composite pictures.

This process is limited by the general principle with compression systems such as the MPEG-2 system that each generation of compression tends to reduce the quality of the resulting images. It is undesirable if the simple addition of logo or similar information causes a deterioration in the overall image quality of the pictures to which the logo information is added.

In order to alleviate this drawback, it is desirable to recompress as much as possible of the composite picture using compression parameters (such as a quantisation parameter Q, motion vectors, DCT frame type and so on) which are the same as those used to compress the corresponding block of the relevant input picture. However, this general aim is made more difficult by the following considerations:

(a) how many (or, looked at another way, how few) blocks need to be re-encoded—with newly derived parameters—because their image content is not related sufficiently closely to one of the input images?

(b) what happens if this re-encoding scheme would lead to too much output data being generated for the transmission or storage channel under consideration?

(c) how can it be detected whether the motion vectors, associated with blocks whose parameters are to be re-used, point to areas of the same image in the preceding or following pictures?

(d) how can these matters be addressed with a manageable data processing overhead?

SUMMARY OF THE INVENTION

The invention aims to address or at least alleviate at least one of these problems.

This invention provides video signal processing apparatus in which at least first and second input video signals are combined to generate an output compressed video signal, the first and second video signals each having respective associated motion vectors from a data compression process applied to the video signals;

the apparatus comprising:

means for establishing a set of the motion vectors associated with the first and second video signals which can potentially be re-used in compressing the output compressed video signal; and means for testing the set of motion vectors, the testing means being operable:

i. to define, with respect to reference images referred to by the motion vectors under test, a first border region of a predetermined width surrounding those parts of the reference images derived in part from the first video signal, and a second border region of a predetermined width surrounding those parts of the reference images derived in part from the second video signal; and ii. to test whether motion vectors of the set which are associated with parts of each video signal refer either to image areas derived in part from the other video signal, to the first border region or to the second border region;

in which any motion vectors of the set being found by the testing means to refer to images areas derived to at least the predetermined degree from the other input video signal, the first border region or the second border region are not used in the compression of the output compressed video signal.

The invention allows for an efficient selection of which motion vectors—preferably, from an initial "shortlist", although that shortlist may potentially include all of the available motion vectors—are suitable for use in the compression of an output video signal derived from two or more input video signals. A test is performed to detect whether each motion vector points either to an image area derived (to at least a predetermined degree such as 100%) from the other input video signal or to a border region established around both or all such image areas.

The border region allows for the possibility, particularly in a system where the reference map is created to a block resolution rather that to a pixel resolution, that a motion vector at an extreme position in one block could point beyond the nominal target block and into an adjacent one.

The use of one border region surrounding image areas derived from both or all input video signals reduces the storage and processing overhead of creating the border region and means that only one test needs to be performed on each potential motion vector.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
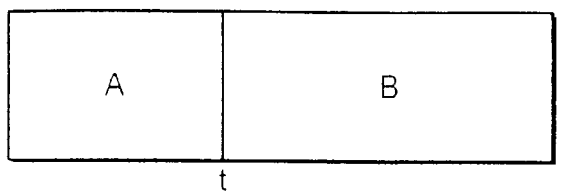
FIG. 1 schematically illustrates a video splice operation.

FIGS. 1 go 4 illustrate in schematic form some video processing operations which can be carried out to combine one video signal (A) with another video signal (B).

Figure 2:
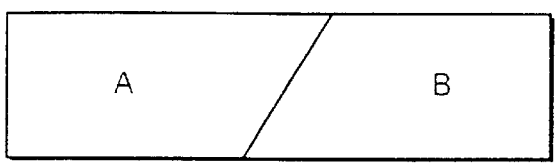
FIG. 2 schematically illustrates a video dissolve operation.

FIGS. 1 and 2 are schematic "timeline" representations of a splice operation and a dissolve operation respectively. In FIG. 1, an abrupt change is made from signal A to signal B at a particular time t. In FIG. 2, a gradual change is made so that signal A is mixed into signal B over a particular time period.

Figure 3:
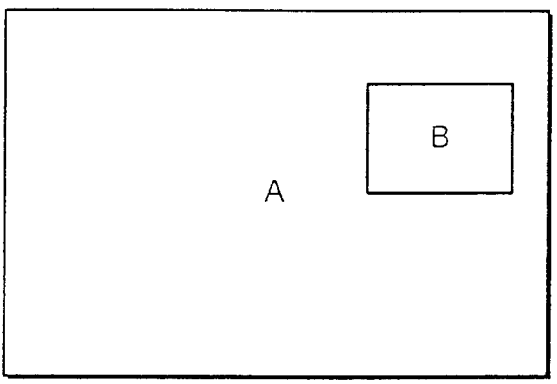
FIG. 3 schematically illustrates a video logo insertion operation.
Figure 4:
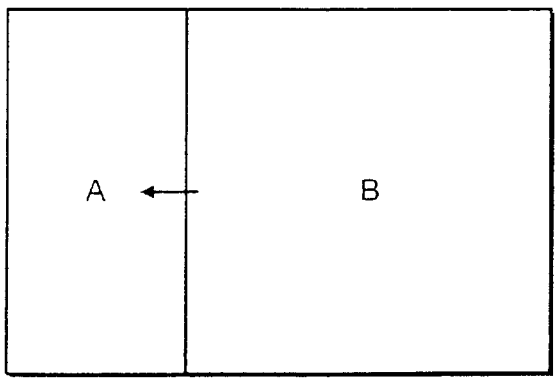
FIG. 4 schematically illustrates a video wipe operation.

FIGS. 3 and 4 schematically illustrate television pictures themselves. FIG. 3 illustrates a "logo" insertion, where a sub-portion of picture A is replaced by or mixed with picture B, and FIG. 4 illustrates a wipe operation where the two pictures occupy complimentary portions of the screen and the boundary between the two is moveable.

The present description is concerned with the types of video processing operations which need to be carried out in connection with FIGS. 2, 3 and 4. In other words, these are operations where parts of both pictures A and B are present on the screen at the same time. The matter of FIG. 1, which is the splicing of one video signal to another, is not dealt with in the present application.

FIGS. 5 to 7 show, again in schematic form, the superposition of a logo onto a video picture, that is to say a more detailed version of FIG. 3.

Figure 5:
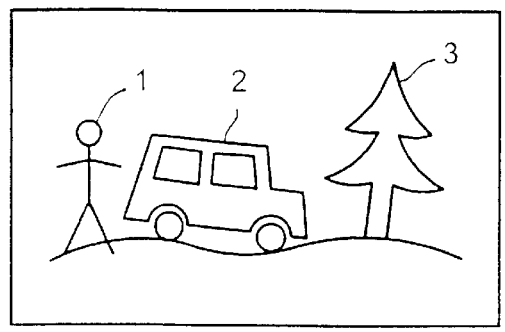
FIGS. 5 and 6 schematically illustrates a video logo insertion operation in greater detail.
Figure 6:
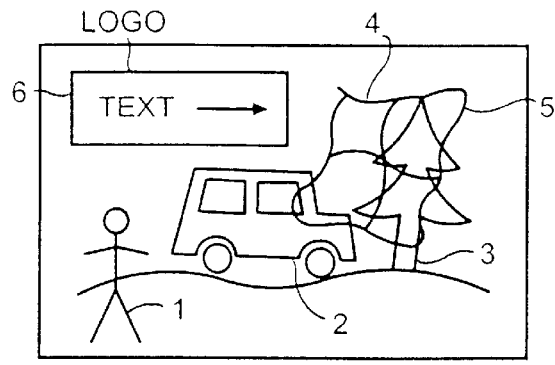

In FIG. 5, a video picture shows an original scene which may typically include moving objects 1, 2 and static objects 3. In FIG. 6, additional video information including a textual logo 6 and further information such as a geographical map 5 is superposed over the original image. An example of circumstances in which this might be desired is to broadcast a warning of an impending occurrence such as a weather-related warning for a particular region, while not disturbing the underlying programme too much.

Figure 7:
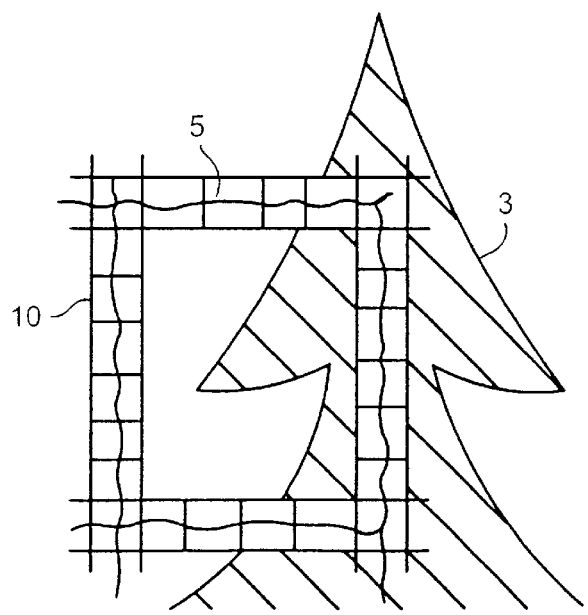
FIG. 7 is a schematic close-up view of part of FIG. 6 showing an overlap between an inserted logo and background video.

FIG. 7 is a schematic close-up view of part of FIG. 6 showing the overlap between the static map 5 and parts of the original image 3. In a block-based system such as MPEG 2, where each image is divided into so-called macroblocks, it can be seen that a number of macroblocks are affected by the overlap of the images. The macroblocks are illustrated as square blocks 10 in FIG. 7.

The remainder of the present description will deal with a video signal processor capable of handling the presence of video information from two sources A and B present on the screen at one time. A block diagram of the apparatus will be described first, followed by a flowchart defining its mode of operation. Particular features of the operation will then be described with reference to further respective figures.

Figure 8:
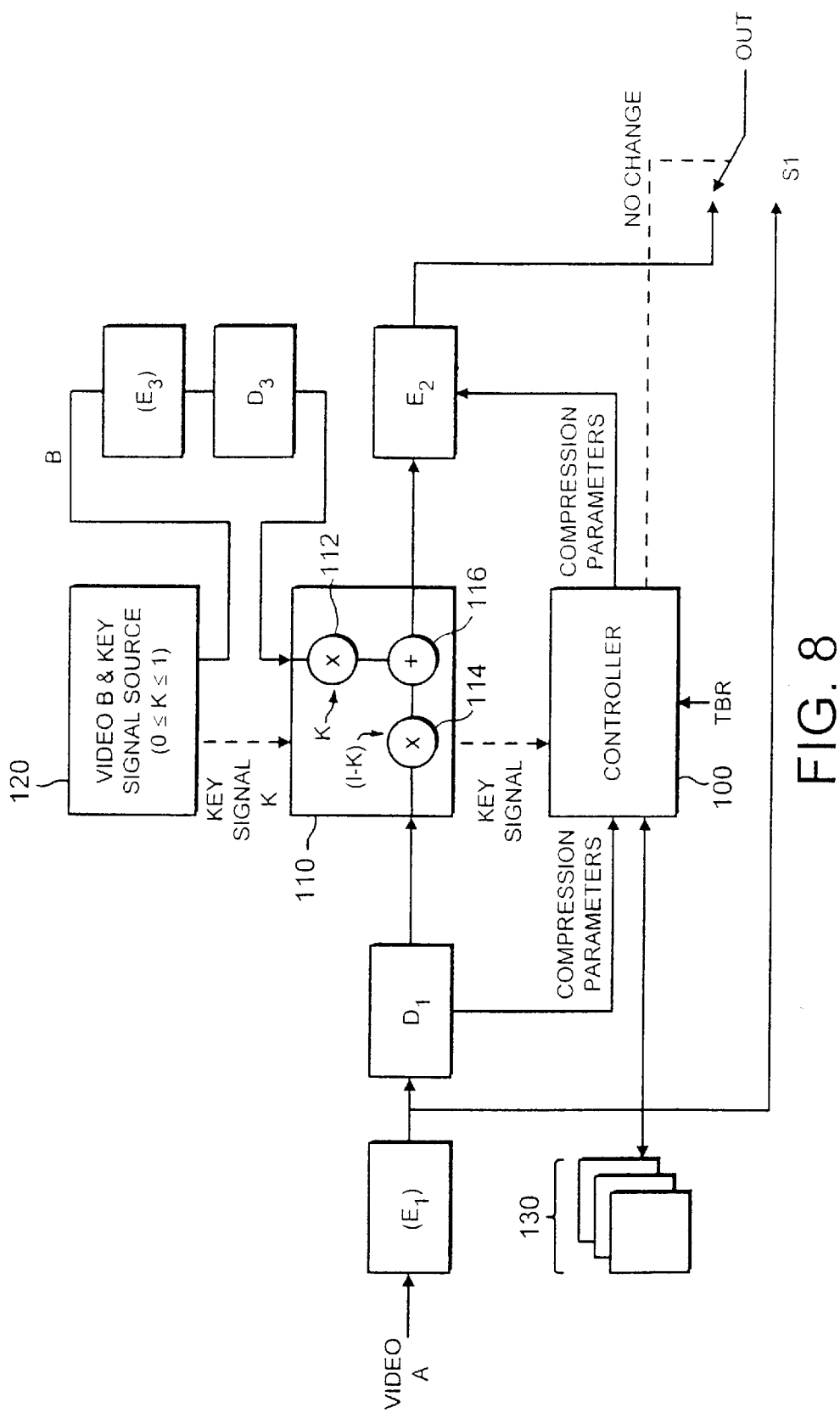
FIG. 8 is a schematic diagram of a video signal processor.

Accordingly, FIG. 8 is a schematic diagram of a video signal processor.

An encoder E1 receives an input video signal A and encodes it according to a desired output bit rate and GOP format. In situations where no mixing between the two video signals is required, the video signal encoded by the encoder E1 can be supplied directly for output via a switch S1 under the control of a controller 100. The encoder E1 is written in parentheses to illustrate the fact that if the input video signal is already in the required format, the encoder E1 may of course not be required.

The output of the encoder E1 is supplied to a complimentary decoder D1 which decodes the video back to an uncompressed or "baseband" form. The baseband video signal is supplied to a mixer 110 and compression parameters used in the original compression in each block of the input video signal A are supplied to the controller 100.

A source 120 of a video signal to be mixed, video B, supplies video signal B to another encoder E3. Again, E3 is shown in parentheses to illustrate the fact that it may not be required if the video signal B is already in a required format. The output of encoder E3 is a video signal at a corresponding bit rate and GOP format to that of the output of encoder E1, and is supplied to a further decoder D3 which derives compression parameters from the video signal and decodes video B back to baseband form for supply to the mixer 110.

If desired, either of the encoder-decoder pairs E1/D1 or E3/D3 may be omitted and uncompressed or "baseband" video added in directly at one of the inputs of the mixer 110.

The source 120 also supplies a key signal K to the mixer 110 (although the key signal could of course come from a different external source). The key signal defines the relative proportions of video A and video B to be used for each pixel of the required output image, and so the key signal K may vary between 0 (all video A to be used) and 1 (all video B to be used). This variation takes place on a pixel-by-pixel basis, with K values between 0 and 1 indicating a mix between the two signals at that position.

Accordingly, the mixer 110 operates in a generally conventional manner, and on a pixel-by-pixel basis, to multiply pixels of video B by K at a multiplier 112, to multiply pixels of video A by (1−K) at a multiplier 114, and then to add the two products together at an adder 116 to generate pixels of an output mixed video signal. The mixed video signal is supplied to a further encoder E2, again operating to the same nominal bit rate and GOP format as E1 and E3, which serves to encode the mixed video signal for output via the switch S1.

The controller 100 controls the operation of the encoder E2. In fundamental terms, the controller 100 controls whether the encoder E2 re-uses some or all of the compression parameters associated with the compression of blocks of the video signals A and B before they were mixed, or generates new compression parameters for encoding the blocks of the mixed video signal.

As part of its operation, which will be described in much greater detail below, the controller 100 receives details of the compression parameters of video signal A, details of the compression parameters of video signal B and a specification of a target output data rate (TBR). The controller 100 also accesses memory stores 130 in which various pieces of information including some derived from the key signal K may be retained.

Figure 9:
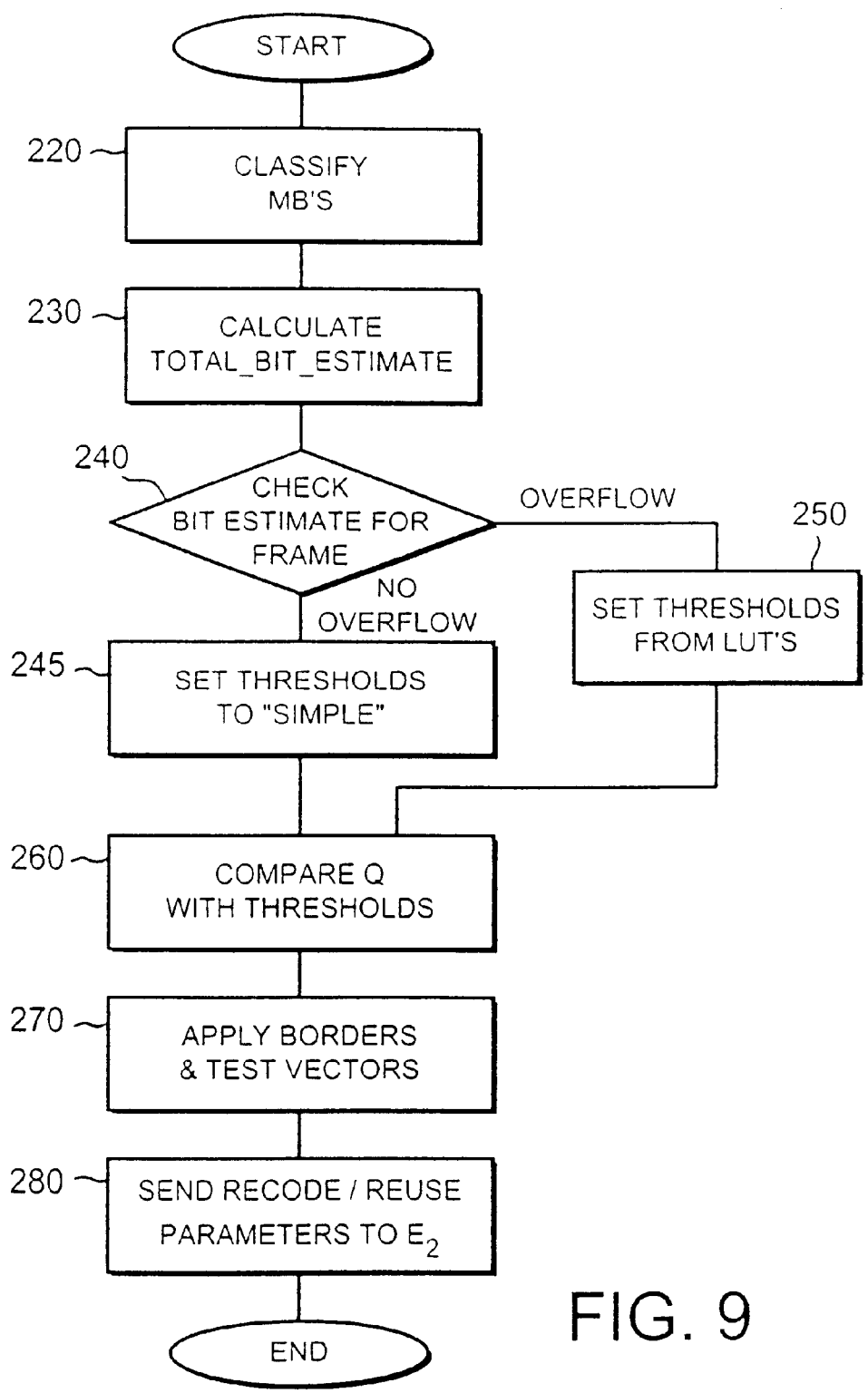
FIG. 9 is a schematic flow chart illustrating the operation of the processor of FIG. 8.

FIG. 9 is a flowchart schematically illustrating the operation of the processor of FIG. 8.

At a step 220, the macroblocks of the mixed video signal are classified to establish whether they are considered to be wholly from video signal A, wholly from video signal B or a mixture of the two. This classification process will be described below with reference to FIG. 11.

At a step 230 the controller 100 establishes an estimate of the total number of bits required to encode the current frame of the mixed video signal. To do this, it does not actually apply a rate control algorithm to the mixed video signal, but instead calculates the estimate from historical data relating to the number of bits required to encode each macroblock of the two individual source video signals A and B. This process will be described in detail below.

At a step 240 the controller compares the bit estimate for the current frame with the target data quantity TBR. If the bit estimate does not exceed TBR it is considered that there is not a data overflow and control passes to a step 245. If however the bit estimate exceeds TBR then it is considered that there is an overflow and control instead passes to a step 250.

The next stage is to set a "threshold" value which will be used (as described in detail below) to determine which macroblocks should be recoded completely and which should re-use the parameters associated with one or both of the input video signals. This process will be described with reference to FIGS. 12 and 13 below.

The way in which this threshold is set and used varies in dependence on whether an overflow was detected at the step 240.

At the step 245, i.e. the step reached if there is no detected overflow, the threshold is set to a "simple" regime. This process for setting the threshold will be described with reference to FIG. 10 below.

At the step 250, i.e. the step reached if there is a detected overflow, the threshold is set by a more complex process.

If it is detected that there is an overflow situation, it is necessary for more of the macroblocks to be re-encoded and fewer macroblocks to have their parameters re-used. However, it is desirable to re-encode as few macroblocks as possible, so the amount of re-encoding is set to be dependent on the amount of overflow. To do this, at the step 250 the threshold (used as described below, to determine which macroblocks should be re-encoded) is set in accordance with a look-up table (LUT) system to be described with reference to FIGS. 14 and 15a to 15c.

Figure 12:
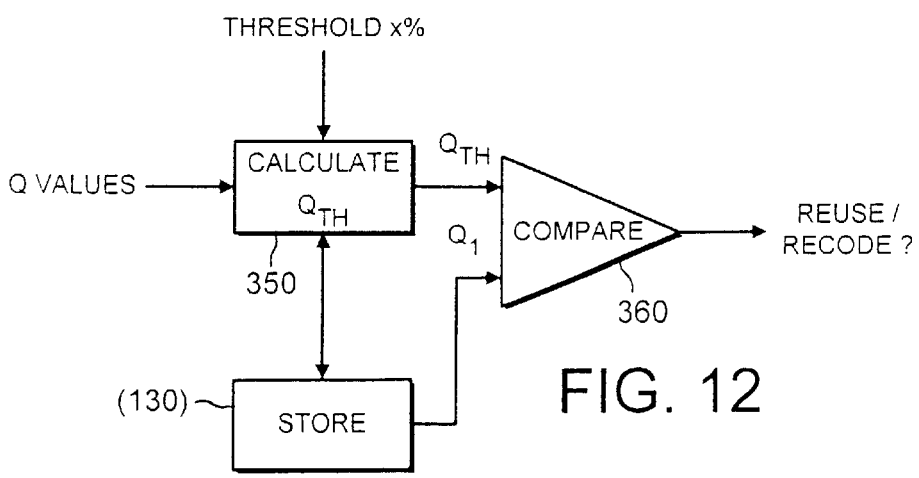
FIG. 12 schematically illustrates the comparison of quantisation parameter values with a threshold value.
Figure 13:
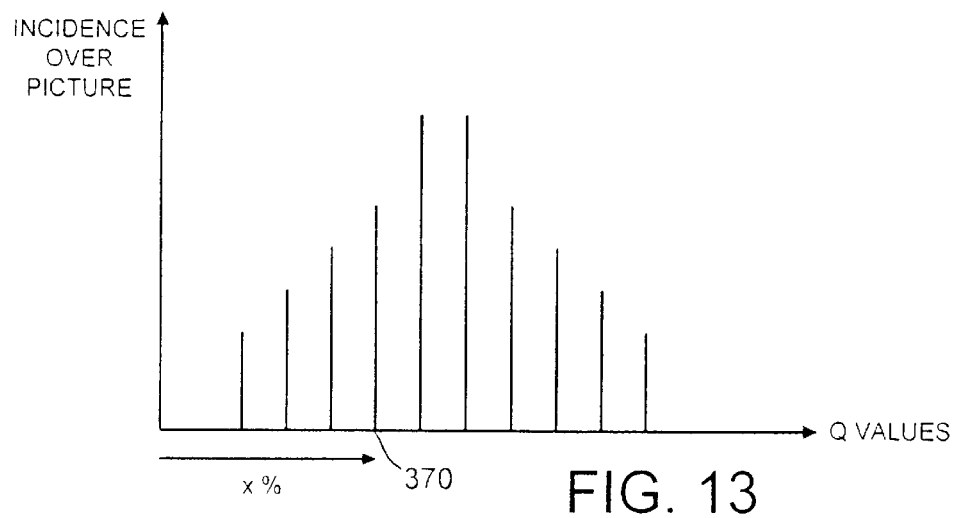
FIG. 13 is a schematic histogram illustrating the distribution of quantisation parameter values within a picture.

At a step 260 the quantisation parameters for video A and video B are compared with the threshold to determine a set of macroblocks to be re-encoded. This is shown in FIGS. 12 and 13. Control passes to the step 270.

At the step 270, for those macroblocks where coding parameters can be re-used, a test is carried out to determine whether the motion vectors associated with the macroblocks point to valid areas of reference images. For example, a macroblock may be wholly inside video A but its associated motion vector may point to a region replaced by video B in the reference frame. In these circumstances it would be inappropriate to use that motion vector. This process is described in detail below with reference to FIGS. 16a to 16d and 17.

Once this test is complete, the full set of re-code or re-use parameter information is sent by the controller 100 to the encoder E2 which encodes the mixed video signal in accordance with this information. In cases where mixing takes place between video A and video B, the controller 100 operates the switch S1 to select the output of encoder E2 for the entire frame.

The encoder E2 includes a rate control algorithm. This may be, for example, a predictive rate control algorithms such as the so-called "test model 5" of the MPEG system, or maybe a pre-encode or rehearsal type rate control algorithm such as that described in GB-A-2 306 831. In any event, the parameters applied by the controller 100 to the rate control algorithm are identical to the original compression parameters received from the decoders D1 and D3 in the case of macroblocks where it has been determined that the parameters should be re-used, and, in the case of macroblocks where it has been determined that the parameters should not be re-used, comprise an indicator flag indicating to the rate control algorithm that new parameters should be derived.

A special case here is the particular situation of an inserted logo, where in order to maintain the picture quality of the logo itself it may be desirable to specify a limit for the quantisation parameter for use on blocks containing logo material in order to set a maximum degree of harshness of the quantisation process. Again, that condition can be signalled from the controller 100 to the rate control algorithm in respect of macroblocks determined to contain primarily or all video B material. (This of course depends on a subjective decision as to whether the inserted video signal comprises a logo or other material, and this is naturally a decision made by the operator or user).

The rate control algorithm of the encoder E2 generates compression parameters for those macroblocks to be re-encoded and then the encoder E2 encodes the whole frame on the basis of the received or derived parameters.

Specific details of the operation of the apparatus will now be described with reference to the remaining drawings.

Although these are shown as individual drawings, unless otherwise indicated they comprise features which may be implemented as part of the controller 100.

Figure 11:
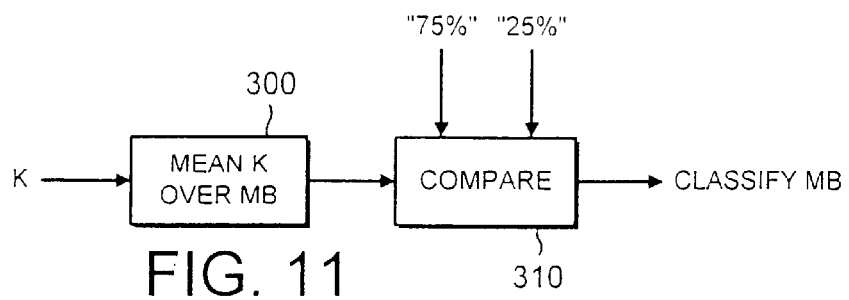
FIG. 11 schematically illustrates the classification of macro blocks by mean key value.

FIG. 11 schematically illustrates the classification of motion vectors (step 220 of FIG. 9).

For pixels of each macroblock (in effect, macroblocks of the mixed video signal although this classification process, being dependent only on K, can take place before the corresponding mixing process), the values of K (key value) are averaged so that a mean K value over the macroblock is generated by an averager 300. The values of key_average thus generated are passed to a comparator 310 which compares them with two thresholds: a 75% threshold and a 25% threshold. Of course, the values of 25% and 75% are just examples and other values could be used instead.

Any macroblocks for which the key_average value is detected to be 0% or 100% are determined to be from a single video source and so, unless an overflow situation is detected, are re-encoded using parameters associated with the majority video source.

Macroblocks having a key_average value of under 25% or over 75% are determined to be primarily form a single video source. For example, if a macroblock's key_average signal indicates that the average contribution of video source A to that macroblock is 90% and of video source B 10%, then the macroblock is determined by this technique to be primarily from video source A. In the absence of an overflow situation, the macroblock is flagged to be tested by comparing the quantisation parameter of the majority video source against a threshold. If it passes this test, it is then encoded re-using the compression parameters of the corresponding macroblock of the majority video source (video source A in the example above).

Any macroblocks having a key_average value between 25% and 75% are set to a "re-encode" status. These macroblocks are re-encoded with fresh encoding parameters being generated.

The skilled man will appreciate that in this or any thresholding process, the handling of values which lie exactly on a threshold value is set one way or the other by a simple and arbitrary convention. In the present example, the test for the "re-encode" status is inclusive of the two threshold values, i.e. "re-encode" is true if $$25\% \leq key\_average \leq 75\%$$

The calculation (in step 230) of the variable total_bit_estimate for the frame will now be described. This calculation makes use of the key_average values derived for each macroblock in FIG. 11 and also of the historical number of bits required to encode each macroblock of the two input video signals A & B, obtained from the decoders D1 and D3.

The total bit estimate is given by:

$$total\_bit\_estimate = MB(A)\_total\_bits + MB(B)\_total\_bits + MB(A+B)\_total\_bits$$

Here, MB(A)_total_bits is the sum of bits in macroblocks which contain only picture source A (key average=100%); MB(B)_total_bits is the sum of bits in macroblocks which contain only picture source B (key average=0%); and MB(A+B)_total_bits is a weighted sum of bits in macroblocks which contain both picture sources A and B (0%<key average<100%).

In particular, the quantity MB(A+B)_total_bits is calculated as follows. For a macroblock N where 0%<key average<100%, the contribution of bits to the total bit estimate for that macroblock, Bits(N) is:

$$Bits(N) = [key\_average*bits(N\_B)] + [(100\% - key\_average)*bits(N\_A)]$$

where bits (N_A) is the number of bits in respect of that macroblock of video A and bits (N_B) is the number of bits in respect of that macroblock of video B.

It will in fact be clear that this same equation can in fact be used for the assessment of bits contributions for macroblocks for the whole frame, as those where the key average is 0% or 100% will simply cancel one term of the equation.

So, it will be clear that the value total_bit_estimate is just an estimate, but it is a value which is available at this stage of the processing from history data alone, i.e. without having to apply the mixed video signal to any sort of rate control algorithm.

The variable total_bit_estimate is compared (step 240 of FIG. 9) with the target data quantity for the frame TBR by a simple comparator (not shown).

Figure 10:
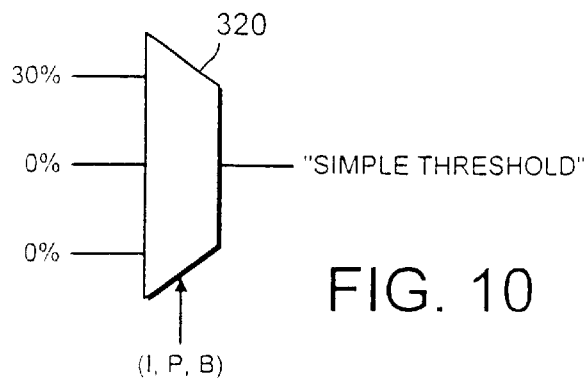
FIG. 10 schematically illustrates the setting of "simple" thresholds.

If the comparison indicates no overflow, then at the step 245 of FIG. 9 a simple threshold regime is set. FIG. 10 schematically illustrates this process, where a multiplexer 320 selects a threshold value of (in this example) 0%, 0% or 30% dependent on whether the current frame is an B, P or I frame respectively. In other words, different thresholds can be set for the three different types of frame. Of course, the thresholds for P and B frames can differ from one another—for example, a set of thresholds could be used having I: 40%; P: 30% and B: 20% could be used. The process by which the thresholds are used will be described below, but put simply, a higher threshold implies that fewer macroblocks will be re-encoded.

A quite different mechanism is used at the step 250 of FIG. 9 for setting the threshold in the case where an overflow is detected. This process will be described with reference to FIGS. 14 and 15a to 15c.

Figure 14:
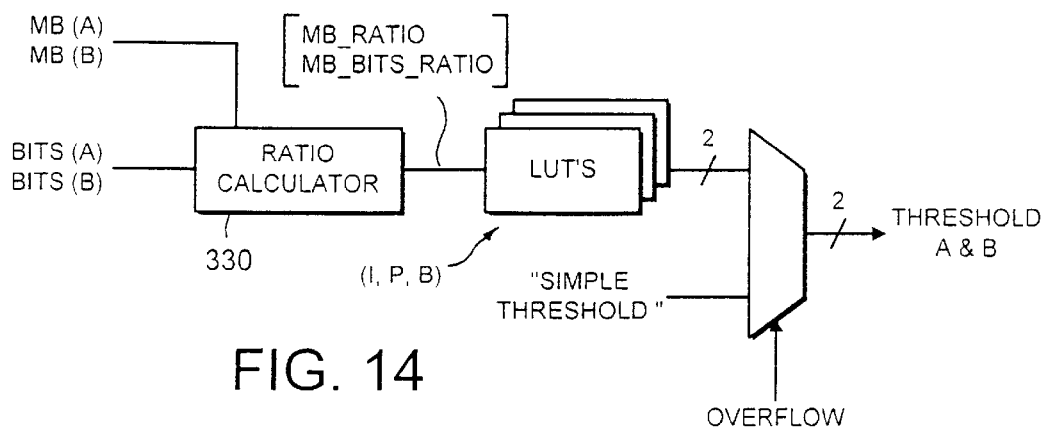
FIG. 14 schematically illustrates the generation of complex thresholds.

FIG. 14 schematically illustrates an arrangement for deriving a threshold value from a set of look-up tables (LUTs).

A ratio calculator 330 receives four sets of information:
sum of MB(A)—the number of macroblocks for which key_average is 0% (all from video A)
sum of MB(B)—the number of macroblocks for which key_average is 100% (all from video B)
Bits(A)—the number of encoded bits for each macroblock for which key_average is 0%
Bits(B)—the number of encoded bits for each macroblock for which key_average is 100%

The ratio calculator generates two values from these variables, summed across applicable macroblocks of the whole picture:

$$MB\_ratio = \frac{\sum MB(A)}{\sum MB(A) + \sum MB(B)}$$

$$MB\_bit\_ratio = \frac{\sum Bits(A)}{\sum Bits(A) + \sum Bits(B)}$$

It will be seen that macroblocks containing parts of both input video signals A & B are not included in the above calculations. Only those macroblocks for which key_average is 0% or 100% are used to derive MB_ratio and MB_bit_ratio.

The variable MB_ratio determines which of a number of LUTs should be used. There may also be separate sets of LUTs applicable to I, P and B frames, in which case MB_ratio selects a LUT from the set of LUTs applicable to the current frame type.

For example, if there are 10 possible LUTs (or 10 for each frame type) then a linear division of the range of values of MB_ratio could be used, whereby:

| | |
|---|---|
| 0% < MB_ratio <= 10% | selects table 1 |
| 10% < MB_ratio <= 20% | selects table 2 |

. . . and so on.

Alternatively, a non-linear selection regime could be used, for example:

| | |
|---|---|
| 0% < MB_ratio <= 5% | selects table 1 |
| 5% < MB_ratio <= 11% | selects table 2 |
| 11% < MB_ratio <= 18% | selects table 3 |
| . . . | |
| MB_ratio >= 50% | selects table 10 |

Figure 15A:
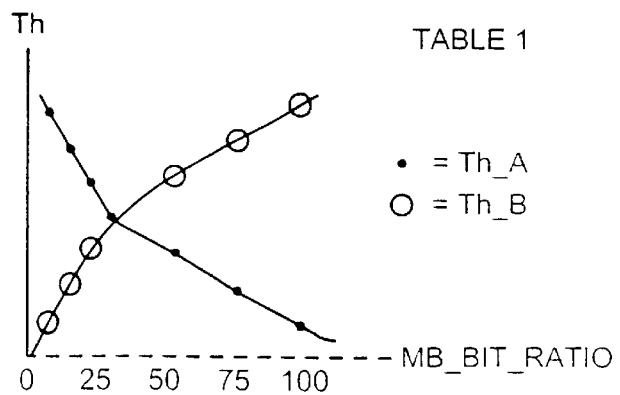
FIGS. 15a to 15c schematically illustrate threshold look-up tables.
Figure 15B:
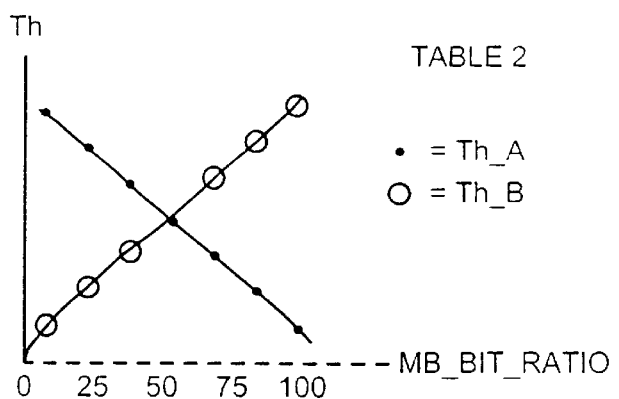
Figure 15C:
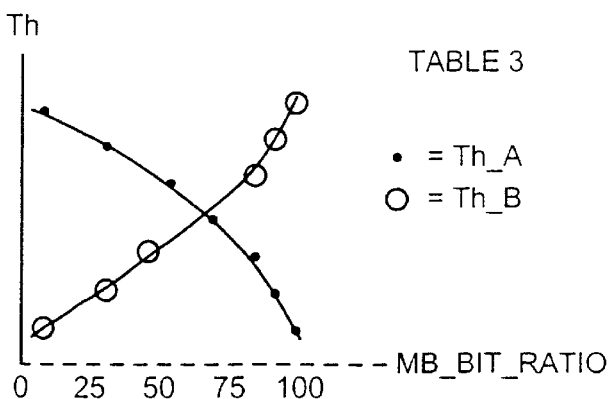

Examples of some LUTs are shown in FIGS. 15a to 15c. FIG. 15a schematically shows a LUT applicable to lower values of MB_ratio, FIG. 15b to mid-values of MB_ratio and FIG. 15c to upper values of MB_ratio. Obviously the number of tables used in a particular system, and the ranges of MB_ratio which select each such table, are routine design decisions well within the capability of the skilled man.

It will be seen that each table defines two threshold amounts, Th_A and Th_B for different values of MB_bit_ratio between 0% and 100%. So, once the appropriate table has been selected, the value calculated for MB_bit_ratio for the current frame selects respective values of Th_A and Th_B.

In table 1, the crossover between the two curves for Th_A and Th_B is at an MB_bit_ratio value of about 25%; in table 2 it is about 50% and in table 3 it is about 75%.

The way in which the threshold value—either the single threshold value developed from the "simple" scheme of step 245 or the pair of values Th_A and Th_B developed from the LUTs of step 250—is applied to the macroblocks to determine which macroblocks should be re-encoded will now be described with reference to FIGS. 12 and 13.

As mentioned above, the comparison of quantisation parameters Q with the threshold(s) set as described above is used to determine whether or not some of the macroblocks are to be re-encoded or to have their original parameters re-used. Although shown as a single step in FIG. 9, this process differs in dependence on whether an overflow has been detected.

The principles common to both implementations, i.e. with and without an overflow, are schematically illustrated in FIGS. 12 and 13.

The Q values from all of the macroblocks under consideration (see below) are received by a Q threshold calculator 350 and stored in one of the stores 130. The Q threshold calculator then orders the Q values in ascending numerical order and derives the incidence of each possible Q value over the macroblocks of interest. A schematic histogram illustrating this process is shown in FIG. 13.

The threshold x % is then applied to this distribution, so that the highest Q value for which the cumulative incidence up to that Q value lies within the threshold proportion x % is established. For example, a Q value 370 in FIG. 12 fulfils this requirement for the distribution shown. Macroblocks, of those under consideration, having Q values up to and including that highest Q value 370 are then encoded re-using their original encoding parameters, or at least those of the majority component of the macroblock. Macroblocks, of those under consideration, for which the Q value exceeds the highest Q value 370 are re-encoded with fresh coefficients.

It is noted here that this system has as a convention that a numerically lower Q value implies a less harsh quantisation. The arrangement of re-using Q values up to an upper limit 370 has the effect of not allowing deterioration of the picture quality of those macroblocks (of the ones under consideration) which were originally less harshly compressed.

Accordingly, once the highest Q value 370 ($Q_{TH}$ in FIG. 12) has been established, the Q values are read out from the store 130 and compared at a comparator 360 with $Q_{TH}$. The determination of whether to re-encode or to re-use is thus made.

This process applies only to a set of macroblocks under consideration, and the set differs in dependence on whether an overflow situation has been detected or not. The two cases will now be considered separately.

(a) No Overflow

In this situation, the simple threshold scheme is used.

Any macroblocks having a key_average value of 0% or 100% have their original parameters re-used.

Any macroblocks for which the "re-encode" flag is set, i.e. those for which 25%≦key_average≦75% are re-encoded with fresh parameters generated by the encoder E2.

Any macroblocks not fulfilling either of the above conditions, i.e. those for which the key_average value is not 0% or 100% but is less than 25% or more than 75%, are tested as described above.

This test takes place in two stages: one stage covers those macroblocks having a key_average value less than 25%, and for this stage the distribution of Q values from all macroblocks of picture A is assessed by the calculator 350 to determine a distribution and a value of $Q_{TH}$. The derived value of $Q_{TH}$ is then applied to the macroblocks having a non-zero key_average value less than 25%.

A second stage does the same for macroblocks which are primarily of video B, that is to say, those macroblocks having a key_average value greater than 75%, and for this stage the distribution of Q values from all macroblocks of picture B is assessed by the calculator 350 to determine a distribution and a value of $Q_{TH}$. The derived value of $Q_{TH}$ is then applied to the macroblocks having a non-unity key_average value greater than 75%.

The above process leads to a proportion of the macroblocks under consideration being re-used and a proportion being re-encoded. If the threshold x is set to 0%, as in one of the examples above, then it follows that all of the macroblocks to which that test is applied are re-encoded.

(b) Overflow Detected

In this situation, the complex threshold scheme involving LUTs is used. This generates separate thresholds for video A macroblocks and video B macroblocks, namely Th_A and Th_B.

All macroblocks having a key_average value of between 0% and 100% are re-encoded with fresh parameters being derived by the encoder E2.

This leaves those macroblocks for which key_average is exactly 0% or exactly 100%. These are tested as described above.

As before, The test takes place in two stages: one stage covers those macroblocks having a key_average value of 0%, and for this stage the distribution of Q values from all macroblocks of picture A having a key_average value of 0% is assessed by the calculator 350 using the threshold Th_A to determine a distribution and a value of $Q_{TH}$. The derived value of $Q_{TH}$ is then applied to the macroblocks having a key_average value of 0%. In other words, the process differs in that the distribution detected by the calculator 350 is not that of the whole of picture A, but that of only those macroblocks having a key_average value of 0%.

The second stage covers those macroblocks having a key_average value of 100%, and for this stage the distribution of Q values from all macroblocks of picture B having a key_average value of 100% is assessed by the calculator 350 using the threshold Th_B to determine a distribution and a value of $Q_{TH}$. The derived value of $Q_{TH}$ is then applied to the macroblocks having a key_average value of 100%.

Motion Vector Processing

FIGS. 16a to 16d and 17 illustrate the processes carried out at the step 270 of FIG. 9, that is to say, applying borders to boundaries between regions from the two video sources and then testing motion vectors to be re-used to determine whether they point to appropriate parts of the material from the same video source.

Figure 16A:
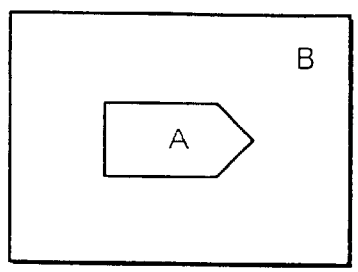
FIGS. 16a to 16d schematically illustrate the addition of borders for vector testing.

FIG. 16a schematically shows an image formed partly of video A and partly of video B. The boundary between the two regions is shown by a solid line.

When a decision to re-use encoding parameters is made, it is important to ensure that a motion vector to be re-used for a macroblock of the video A region actually points to a part of the image which is still formed of video A, i.e. it has not been replaced by video B as part of the mix, wipe or logo insertion process. The same applies to video B.

It has been proposed in the copending applications GB9908812.2 and GB9920930.6 that in carrying out this testing operation, a border perhaps one macroblock wide should be created around the newly inserted material. A benefit of this is that it allows the vector tests to be carried out at a macroblock scale rather than at a pixel scale because the border provides a margin of safety to avoid errors which would otherwise be introduced by this coarser scale approach.

Figure 16B:
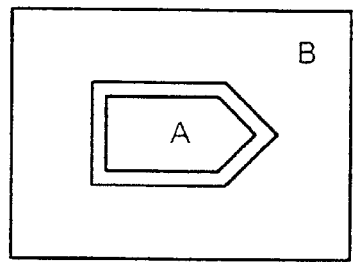
Figure 16C:
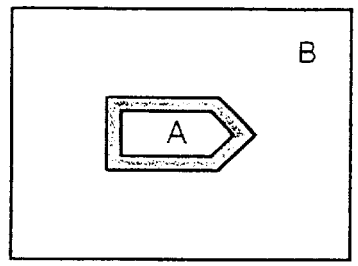

More particularly, a border is created around all macroblocks which are not entirely derived from region A (FIG. 16a) and a border is created around all macroblocks which are not entirely derived from region B (FIG. 16b).

So, the general principle of GB9908812.2 and GB9920930.6 is that if a motion vector associated with a macroblock from region B points or refers to either region A, macroblocks which are not entirely from region B or the border created around those macroblocks not entirely from region B, it is not re-used but instead a new motion vector is generated in its place. Similarly, if a motion vector associated with a macroblock from region A points to either region B, macroblocks not entirely from region A or the border created around those macroblocks not entirely from region A, again it is not re-used but instead a new motion vector is generated in its place.

Figure 16D:
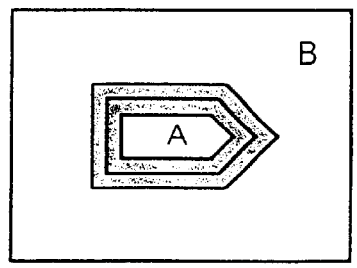

In the present embodiment, the two borders are combined to give a single composite border as shown schematically in FIG. 16d. This reduces the amount of storage needed (by about half) and also reduces the amount of processing needed in the vector testing process, as effectively the same test is applied to vectors from region A or region B. So, a motion vector for a macroblock of A is rejected if it points or refers to:

a macroblock of region B, which is a special case of:
a macroblock not entirely derived from region A,
a border macroblock around macroblocks not entirely derived from region A, or a border macroblock around macroblocks not entirely derived from region B. and vice versa for a motion vector of a macroblock B.

This may mean that the vector A is occasionally falsely rejected, in that the border may encompass macroblocks which are entirely from region A, but that possibility is considered to be outweighed by processing saving obtained and the possibility, if the present system were not used, of erroneously using an incorrect motion vector.

So, the testing now proceeds as follows: If a motion vector from a macroblock in either region A or region B points or refers to:

either a position within the other region or partly derived from that region;

or a position within the composite border then that macroblock is flagged to require new motion vectors, which are then generated by the encoder E2.

Figure 17:
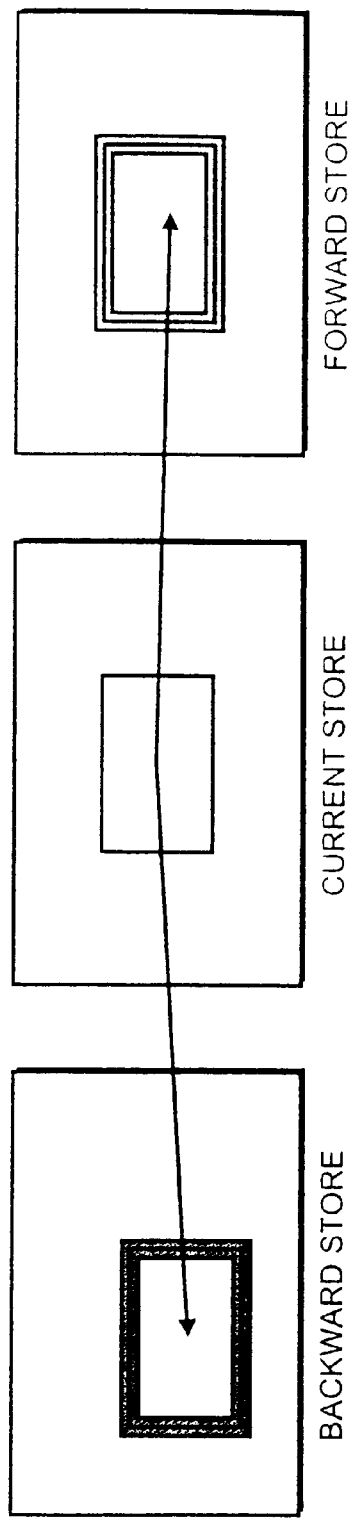
FIG. 17 schematically illustrates a vector testing process.

The overall testing process is shown schematically in FIG. 17, which (as an example) shows the testing of the forward and backward motion vectors associated with a B frame.

The controller 100 maintains three stores in connection with this testing process (which contrasts with five stores for the previously proposed system): a current store, a backward store and a forward store. In each of the backward and forward stores, macroblocks which are classified as being from either source A or source B are flagged and a border is created around each region. Each macroblock form the current store then has its motion vector(s) tested against the forward and backward stores as described above.

Of course, actual stores need not be used to hold a literal reference map of blocks—instead, the question of whether a particular block lies in the possible regions defined above could be calculated each time the answer is needed. However, since the same "target" block (pointed or otherwise referred to by a motion vector) may be referenced several times in the testing process associated with a particular frame, it can save overall processing time to establish this information in the store(s).

It will be appreciated that references to "frames" in the above description are by way of example only—in general the encoding is picture by picture, which could be frames, fields, a combination or other pictures.

The skilled man will appreciate that the apparatus described above may be implemented at least in part by a general purpose computer running appropriate software. Such software and a storage medium by which such software is stored are both considered to be embodiments of the invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Video signal processing apparatus in which at least first and second input video signals are combined to generate an output compressed video signal, said first and second video signals each having respective associated motion vectors from a data compression process applied to said video signals;

said apparatus comprising:

(i) a motion vector selector arranged to establish a set of the motion vectors associated with said first and second video signals which can potentially be re-used in compressing said output compressed video signal; and (ii) a motion vector tester arranged to test said set of motion vectors, said tester being operable:

(a) to define, with respect to reference images referred to by said motion vectors under test, a first border region of a predetermined width surrounding those parts of said reference images derived in part from said first video signal, and a second border region of a predetermined width surrounding those parts of said reference images derived in part from said second video signal; and (b) to test whether motion vectors of said set which are associated with parts of each video signal refer either to image areas derived in part from the other video signal, to said first border region or to said second border region;

in which any motion vectors of the set being found by said tester to refer to images areas derived to at least said predetermined degree from the other input video signal, said first border region or said second border region are not used in said compression of said output compressed video signal.

2. Apparatus according to claim 1, in which said first and second input video signals are compressed video signals.

3. Apparatus according to claim 1, in which said reference map has a resolution of one block of pixels.

4. Apparatus according to claim 3, in which said reference map has a resolution equal to the size of a compression macroblock of said output video signal.

5. Apparatus according to claim 4, in which said border region has a width of one compression macroblock.

6. Apparatus according to claim 1, in which said map generator to establish a reference map indicating at least said border regions for each of said reference images.

7. Apparatus according claim 1, in which said map generator comprises logic arranged to detect those motion vectors associated with parts of said first or second input video signals used to at least said predetermined degree to derive corresponding parts of said output video signal.

8. A method of video signal processing in which at least first and second input video signals are combined to generate an output compressed video signal, said first and second video signals each having respective associated motion vectors from a data compression process applied to said video signals;

said method comprising the steps of:

(i) establishing a set of said motion vectors associated with said first and second video signals which can potentially be re-used in compressing said output compressed video signal;

(ii) defining, with respect to reference images referred to by said motion vectors under test, a first border region of a predetermined width surrounding those parts of said reference images derived in part from said first video signal, and a second border region of a predetermined width surrounding those parts of said reference images derived in part from said second video signal; and (iii) testing whether motion vectors of said set which are associated with parts of each video signal refer either to image areas derived in part from the other video signal, to said first border region or to said second border region;

(iv) in which any motion vectors of the set being found by said testing means to refer to images areas derived to at least said predetermined degree from the other input video signal, said first border region or said second border region are not used in said compression of said output compressed video signal.

9. Computer software having program code for carrying out a method according to claim 8.

10. A storage medium by which computer software according to claim 9 is stored.

* * * * *